United States Patent
Miyamoto

(10) Patent No.: US 8,247,477 B2
(45) Date of Patent: Aug. 21, 2012

(54) POLYBUTYLENE TEREPHTHALATE RESIN COMPOSITION EXHIBITING AN IMPROVED GLOW-WIRE IGNITION TEMPERATURE FOR INSULATING PARTS

(75) Inventor: Yasumitsu Miyamoto, Fuji (JP)

(73) Assignee: Wintech Polymer Ltd., Tokyo (JP)

( * ) Notice: Subject to any disclaimer, the term of this patent is extended or adjusted under 35 U.S.C. 154(b) by 367 days.

(21) Appl. No.: 12/227,933

(22) PCT Filed: Jun. 19, 2007

(86) PCT No.: PCT/JP2007/062655
§ 371 (c)(1),
(2), (4) Date: Dec. 3, 2008

(87) PCT Pub. No.: WO2008/007528
PCT Pub. Date: Jan. 17, 2008

(65) Prior Publication Data
US 2009/0131559 A1    May 21, 2009

(30) Foreign Application Priority Data
Jul. 14, 2006 (JP) .................................. 2006-194661

(51) Int. Cl.
*C08G 63/682* (2006.01)
(52) U.S. Cl. ..................... 523/506; 523/508; 528/272
(58) Field of Classification Search .................. 523/506, 523/508; 528/272
See application file for complete search history.

(56) References Cited

U.S. PATENT DOCUMENTS
5,684,071 A * 11/1997 Mogami et al. ............... 524/100
2004/0176511 A1* 9/2004 Osamu et al. .................. 524/409
2007/0197696 A1* 8/2007 Mediratta et al. ............. 524/115

FOREIGN PATENT DOCUMENTS
| JP | 3-195765 A | 8/1991 |
| JP | 2000-119497 A | 4/2000 |
| JP | 2004-339510 A | 12/2004 |
| JP | 2005-232410 A | 9/2005 |
| JP | 2006-45544 A | 2/2006 |
| JP | 2006-090751 | * 3/2006 |
| WO | WO2006/090751 A1 | 8/2006 |
| WO | WO 2006090751 A1 * | 8/2006 |

OTHER PUBLICATIONS

English translation of WO 2006/090751, this document is improperly labled as "JP 2006-090751" in the English translation, Aug. 31, 2006.*

* cited by examiner

*Primary Examiner* — Alicia Toscano
(74) *Attorney, Agent, or Firm* — Buchanan Ingersoll & Rooney PC

(57) ABSTRACT

Provided is a polybutylene terephthalate resin composition for insulating parts, which satisfies GWIT Standard over a thickness range of 0.75 to 3 mm, the thickness range having been accepted as difficult to satisfy the Standard. In detail, to (A) 100 parts by weight of a polybutylene terephthalate resin, there are added (B) 5 to 50 parts by weight of a halogen-based flame retardant, (C) 5 to 50 parts by weight of a flame retardant assistant, (D) 1 to 100 parts by weight of a nitrogen-based compound, and (E) 0 to 200 parts by weight of a fibrous reinforcement.

14 Claims, No Drawings

POLYBUTYLENE TEREPHTHALATE RESIN COMPOSITION EXHIBITING AN IMPROVED GLOW-WIRE IGNITION TEMPERATURE FOR INSULATING PARTS

TECHNICAL FIELD

The present invention relates to a polybutylene terephthalate resin (herein after referred also to as "PBT resin") composition having an improved glow-wire ignition temperature, and to an insulating material part composed of the PBT resin composition.

BACKGROUND ART

Since the PBT resin has excellent mechanical characteristics, electrical characteristics, heat resistance, weatherability, water resistance, chemical resistance, and solvent resistance, the resin is widely used in various applications as engineering plastics, in automobile parts, electrical and electronic parts, and the like. Although there have been developed many kinds of technologies relating to the improvement in fire retardancy, their reports on achieving the improvement in the fire retardancy, Comparative Tracking Index (CTI), and other characteristics specified by UL-94 Standard of Underwriter's Laboratories Inc., and very few reports deal with IEC60695-2 Standard of International Electrotechnical Commission (IEC). IEC60695-2 Standard requests the insulating material parts used for electrical and electronic equipment to have durability to ignition and flame propagation during working thereof. Specifically, regarding the equipment parts working without operator, there has been increasing the request for the safety of electrical insulating material part which supports a connection section exceeding 0.2 A of rated current or which is located within 3 mm from the connection section. As a result, it is required to satisfy 850° C. or higher glow-wire flammability index (GWFI) and 775° C. or higher glow-wire ignition temperature (GWIT) according to IEC60695-2 Standard. For a thermoplastic resin to satisfy specifically the GWIT standard is very difficult even in materials having V—O in the evaluation of fire retardancy of UL-94 Standard. Accordingly, there has been increasing the development of flame retardant technology to further improve the conventional technologies in recent years.

As a tendency of actual GWIT evaluations, good result has been obtained at a thickness not allowing the penetration of glow-wire during 30 seconds of contact, (a thickness of 3 mm of fiber-reinforced material, for example), and at a very thin material. For the fiber-reinforced PBT resins, it has been accepted that a thicknesses of 1 to 2 mm are specifically difficult to attain good evaluation result.

Since the resin materials under study are not limited in the product thickness in using in the market, these materials have to satisfy the flame test over the entire applicable thickness range.

Furthermore, these materials are requested to have, in addition to durability to the flame test, a good balance of fire retardancy, tracking resistance, and mechanical properties.

As a known method to impart fire retardancy to a PBT resin, there is a resin composition using a bromine-based flame retardant, antimony trioxide, and melamines in combination (JP-A 3-195765). JP-A 3-195765, however, does not suggest the glow-wire test.

Other than the above, the improvement in GWIT is carried out by an insulating material part which has a resin molded section formed using a resin composition composed of a PBT resin with the addition of polyhalogenated benzyl (meth) acrylate and antimony pentoxide. The insulating material part improves GWIT specified by IEC60695-2-13 Standard at the resin section with a thickness of 2 mm or smaller by combining an insulating plate made of metal or the like. The insulating material part, however, does not satisfy the Standard as a sole PBT resin composition, (JP-A 2005-232410).

Furthermore, the improvement in GWIT is carried out by an insulating material part which has a resin molded section formed from a resin composition composed of a PBT resin with a bromine-based flame retardant, antimony oxides, a glycidyl group-containing copolymer composed of an α-olefin and a glycidyl ester of α,β-unsaturated acid and a normal-chain olefin resin having a molecular weight of 10 thousand to 1 million, (JP-A 2006-45544). The evaluation of GWIT is, however, conducted at a thickness of 3 mm, and the patent disclosure does not suggest the evaluation at a thickness of 0.75 mm or 1.5 mm, which are the thickness recommended by IEC.

DISCLOSURE OF THE INVENTION

According to the present invention, the flame retardant PBT resin compositions satisfy the GWIT Standard over a thickness range of 0.75 to 3 mm, the thickness range having been accepted as difficult to satisfy the Standard, and further the molded parts made therefrom, specifically having a thin thickness, satisfy IEC60695-2 Standard without applying secondary working.

Furthermore, the present invention provides a resin composition having the above-described characteristics, and further satisfying a good balance between fire retardancy, tracking resistance, and mechanical properties, thus allowing wide applications in the market.

To achieve the above object, the inventors of the present invention have conducted detail study, and have found that a resin composition obtained by blending a PBT resin with a halogen-based flame retardant, a flame retardant assistant, a nitrogen-based compound, and a fibrous reinforcement improves the durability to glow-wire, and that the addition of a specified amount of flame retardant gives 775° C. or higher glow-wire ignition temperature specified by IEC60695-2-13 Standard even at a product thickness of 1.5 mm among the recommended thicknesses, the thickness of 1.5 mm having been accepted as specifically difficult to satisfy the Standard, and thus have perfected the present invention.

That is, the present invention provides a polybutylene terephthalate resin composition for insulating parts, which contains: (A) 100 parts by weight of a polybutylene terephthalate resin; (B) 5 to 50 parts by weight of a halogen-based flame retardant; (C) 5 to 50 parts by weight of a flame retardant assistant; (D) 1 to 100 parts by weight of a nitrogen-based compound; and (E) 0 to 200 parts by weight of a fibrous reinforcement, and preferably further contains (F) 1 to 50 parts by weight of a phosphinic acid salt and/or a diphosphinic acid salt (to 100 parts by weight of the (A) component). In addition, the present invention provides an insulating material part composed of the above-mentioned polybutylene terephthalate resin composition.

The polybutylene terephthalate resin composition according to the present invention can provide an insulating material part (printed circuit board, terminal table, plug, and the like) having excellent moldability and assembly characteristics, and improves the safety of insulating material part which supports a connection section exceeding 0.2 A of rated current or which is located within 3 mm from the connection section, thereby allowing wide applications.

DETAILED DESCRIPTION OF THE INVENTION

The present invention is described in detail in the following. The PBT resin composition according to the present invention is composed of (A) a polybutylene terephthalate resin, (B) a halogen-based flame retardant, (C) a flame retardant assistant, and (D) a nitrogen-based compound. It is preferable to add (E) a fibrous reinforcement, more preferable to add (F) a phosphinic acid salt and/or a diphosphinic acid salt.
((A) PBT Resin)

The (A) PBT resin according to the present invention is a thermoplastic resin obtained by polycondensation of terephthalic acid or an ester-forming derivative thereof with an alkylene glycol (1,4-butanediol) having 4 carbon atoms or an ester-forming derivative thereof, and the thermoplastic resin may be a copolymer containing 70% by weight or larger repeating unit of butylene terephthalate.

The dibasic acid components other than terephthalic acid or an ester-forming derivative thereof (such as lower alcohol ester) include: an aliphatic or aromatic polybasic acid such as isophthalic acid, naphthalene dicarboxylate, adipic acid, sebacic acid, trimellitic acid or succinic acid or an ester-forming derivative thereof. The glycol components other than 1,4-butanediol include: a normal alkylene glycol such as ethylene glycol, diethylene glycol, propylene glycol, trimethylene glycol, hexamethylene glycol, neopentyl glycol, or cyclohexane dimethanol; a lower alkylene glycol such as 1,3-octane dial; an aromatic alcohol such as bisphenol A or 4,4'-dihydroxybiphenyl; an alcohol with alkylene oxide additive such as bisphenol A with ethylene oxide 2-mole additive or bisphenol A with propylene oxide 3-mole additive; and a polyhydroxy compound such as glycerin or pentaerythritol, and an ester-forming derivative thereof. According to the present invention, any of the PBT resins obtained by polycondensation of any of the above compounds as the monomer can be used as the (A) component of the present invention, and can be used either alone or two or more thereof as a mixture.

The (A) PBT resin according to the present invention uses o-chlorophenol as the solvent, and has the intrinsic viscosity within the range of 0.6 to 1.2 g/dl, determined at 25° C., preferably 0.65 to 1.1 g/dl, and more preferably 0.65 to 0.9 g/dl. If the intrinsic viscosity is smaller than 0.6 g/dl, the amount of generated gas as the source of PBT resin such as tetra hydrofuran is not fully decreased, and false appearance, adhesion of deposit, and the like are generated at the time of molding, which is not preferred. If the intrinsic viscosity is larger than 1.2 g/dl, the flowability at the time of molding may become insufficient.

As the PBT resin according to the present invention, a branched polymer which belongs to copolymer can also be used. The PBT resin branched polymer referred to herein signifies what is called the PBT resin or a polyester prepared by branch formation through the addition of a polyfunctional compound to butylene terephthalate monomer as the main component. The applicable polyfunctional compounds include trimesic acid, trimellitic acid, pyromellitic acid, and alcohol ester thereof, glycerin, trimethylol ethane, trimethylol propane, and pentaerythritol.
((B) Halogen-Based Flame Retardant)

The (B) halogen-based flame retardant is an essential component for maintaining and improving the fire retardancy. Preferred (B) halogen-based flame retardant includes a halogenated aromatic bisimide compound, a halogenated benzylacrylate, a halogenated polystyrene compound, or a terminal-modified halogenated aromatic epoxy compound, from the standpoint of improving the effect of GWIT.

The combined use of a commonly used halogenated polycarbonate with a nitrogen-based compound (described later), as the halogen-based flame retardant, is not preferable because the retention stability at the time of kneading or molding deteriorates to give rise to the phenomena such as gas generation and viscosity decrease, though there appears an effectiveness in the GWIT performance.

As the combined use of a halogenated aromatic epoxy compound with a nitrogen-based compound (described later) causes the increase in viscosity at the time kneading or molding to deteriorate the productivity, there is a need to select a halogenated aromatic epoxy compound in which the epoxy terminal is modified.

Based on the above findings, a halogenated aromatic bisimide compound, a halogenated benzylacrylate, and a halogenated polystyrene compound are preferable as the halogen-based flame retardant.

The halogen atom includes fluorine, chlorine, bromine, and iodine, and preferable ones are chlorine and bromine.

The (B) halogen-based flame retardant can be used either alone or in combination of two or more of them. The additive amount of the (B) halogen-based flame retardant is within the range of 5 to 50 parts by weight to 100 parts by weight of the (A) PBT resin, preferably 10 to 40 parts by weight, and more preferably 15 to 40 parts by weight. If the additive amount of the (B) halogen-based flame retardant is smaller than 5 parts by weight, sufficient fire retardancy cannot be attained. If the additive amount thereof is larger than 50 parts by weight, mechanical characteristics likely deteriorate.
((C) Flame Retardant Assistant)

Applicable (C) flame retardant assistants include an antimony compound such as antimony trioxide or antimony pentoxide known to give synergy effects of fire retardancy when combined with the (B) halogen-based flame retardant; a silicate such as talc or mica; calcium carbonate; magnesium hydroxide; boehmite; zinc sulfide; zinc oxide, and the like. As of these, an antimony compound is preferred.

The additive amount of the (C) flame retardant assistant is within the range of 5 to 50 parts by weight to 100 parts by weight of the (A) PBT resin, preferably 10 to 40 parts by weight, and more preferably 15 to 30 parts by weight. If the additive amount of the (C) flame retardant assistant is smaller than 5 parts by weight, the effect as the flame retardant assistant cannot be attained. If the additive amount thereof is larger than 50 parts by weight, mechanical characteristics likely deteriorate.
((D) Nitrogen-Based Compound)

Applicable (D) nitrogen-based compounds include a melamine condensate and a melamine-phosphorus reaction product. Examples of the (D) nitrogen-based compound are melamine, melam, melem, mellon, melamine phosphate, dimelamine phosphate, melamine polyphosphate, melam (melem or mellon) polyphosphate, and melamine cyanulate. As of these, melamine cyanulate is preferably used.

The additive amount of the (D) nitrogen-based compound is within the range of 1 to 100 parts by weight to 100 parts by weight of the (A) PBT resin, preferably 5 to 80 parts by weight, and more preferably 10 to 70 parts by weight. If the additive amount of the (D) nitrogen-based compound is smaller than 1 part by weight, the improvement effect of GWIT becomes less. If the additive amount thereof is larger than 100 parts by weight, it can be seen that mechanical characteristics deteriorate and flowability at the time of molding deteriorates.

((E) Fibrous Reinforcement)

To the resin composition according to the present invention, it is preferable to add the (E) fibrous reinforcement to improve the mechanical strength such as tensile strength.

The fibrous reinforcement contains, for example, an inorganic fiber such as glass fiber, silica-alumina fiber, zirconia fiber, or metal fiber (such as stainless steel, aluminum, titanium, copper or brass), and an organic fiber such as aromatic polyamide fiber, fluororesin fiber, or liquid crystalline aromatic fiber. These fibrous reinforcements can be used separately or in combination of two or more of them. A preferred fibrous reinforcement is glass fiber.

The mean fiber diameter of the fibrous reinforcement is not specifically limited, and for example, within the range of 1 to 100 μm, preferably 1 to 50 μm, and more preferably about 3 to about 30 μm. The mean fiber length of the fibrous reinforcement is also not specifically limited, and for example, within the range of about 0.1 to 20 mm.

The additive amount of the (E) fibrous reinforcement can be selected, for example, within the range of 0 to 200 parts by weight to 100 parts by weight of the (A) PBT resin, and preferably from 30 to 100 parts by weight. If the additive amount of the fibrous reinforcement is larger than 200 parts by weight, the melt-kneading properties and the moldability deteriorate, which is not preferable.

The fibrous reinforcement may be subjected to surface treatment, if required, using a converging agent or a surface-treating agent (for example, a functional compound such as an epoxy-based compound, an isocyanate-based compound, a silane-based compound, or a titanate-based compound). The fibrous reinforcement may be preliminarily subjected to surface treatment by the converging agent or the surface-treating agent, or may be subjected to surface treatment by adding the converging agent or the surface-treating agent in preparing the resin composition.

To the PBT resin composition according to the present invention, it is preferable to add a phosphinic acid salt and/or a diphosphinic acid salt as the (F) component to further improve GWIT.

The phosphinic acid salt used in the present invention is, for example, the one represented by the following formula (1), and the diphosphinic acid salt used therein is, for example, the one represented by the following formula (2). Polymers of them can also be used:

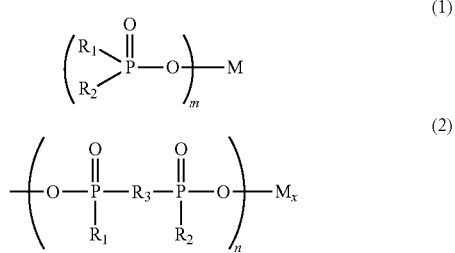

where, $R_1$ and $R_2$ are each straight-chain or branched $C_1$ to $C_6$ alkyl or phenyl, $R_3$ is a straight-chain or branched $C_1$ to $C_{10}$ alkylene, arylene, alkylarylene, or arylalkylene, M is calcium ion or aluminum ion, m is 2 or 3, n is 1 or 3, and x is 1 or 2.

As of these compounds, metal salts such as dimethyl phosphinic acid salt, ethylmethyl phosphinic acid salt, diethyl phosphinic acid salt, and methylphenyl phosphinic acid salt can preferably be used, and further preferred one is a metal salt of diethyl phosphinic acid salt. According to the present invention, one, two or more of these compounds are used.

The additive amount of the (F) phosphinic acid salt and/or diphosphinic acid salt is within the range of 1 to 50 parts by weight to 100 parts by weight of the (A) PBT resin, and preferably 5 to 30 parts by weight. If the additive amount of the (F) component is smaller than 1 part by weight, the improvement effect of GWIT becomes small. If the additive amount thereof is larger than 50 parts by weight, mechanical properties may deteriorate.

Regarding the resin composition according to the present invention, the requirement of 775° C. or higher glow-wire ignition temperature specified by IEC60695-2-13 at any of the test-piece thicknesses of 0.75 mm, 1.5 mm, and 3 mm is satisfied by regulating the respective additive amounts of the (B) halogen-based flame retardant, the (C) flame retardant assistant, the (D) nitrogen-based compound, and the (F) phosphinic acid salt and/or diphosphinic acid salt within the above respective ranges, and by regulating the total additive amount thereof to be 50 parts by weight or larger, preferably 70 parts by weight or larger, to 100 parts by weight of the (A) component. On the other hand, a preferable upper limit of the total additive amount of these flame retardant compounds is normally about 100 parts by weight from the point of view of the mechanical characteristics. Even without the use of the (F) phosphinic acid salt and/or diphosphinic acid salt, 775° C. or higher temperature specified by the Standard can be attained by increasing the additive amount of the (D) nitrogen-based compound. This increase, however, raises a problem of deteriorating the mechanical properties. Accordingly, as described above, the combined use of the (F) phosphinic acid salt and/or diphosphinic acid salt is preferred.

To improve the safety at the time of combustion, the resin composition of the present invention preferably contains a fluorine-based resin as an agent for preventing dropping at the time of combustion.

The fluorine-based resin includes: sole fluorine-containing monomer such as tetra fluoroethylene, chlorotrifluoroethylene, vinylidene fluoride, hexa fluoropropylene, or perfluoroalkylvinylether, and a copolymer thereof; and a copolymer of the above-described fluorine-containing monomer with a copolymerizable monomer such as ethylene, propylene, or (meth)acrylate. Examples of that type of fluorine-based resin are: sole polymer such as polytetrafluoroethylene, polychlorotrifluoroethylene, polyvinylidene fluoride, or the like; a copolymer such as tetra fluoroethylene-hexafluoropropylene copolymer, a tetra fluoroethylene-perfluoroalkylvinylether copolymer, an ethylene-tetra fluoroethylene copolymer, or an ethylene-chlorotrifluoroethylene copolymer. These fluorine-based resins can be used either alone or in combination of two or more of them. These fluorine-based resins can be used in the form of dispersion.

The additive amount of the fluorine-based resin is, for example, 0 to 10 parts by weight to 100 parts by weight of the (A) PBT resin, preferably 0.1 to 5 parts by weight, and more preferably about 0.2 to 1.5 parts by weight.

Furthermore, to the resin composition according to the present invention, there may be added, if required, common additives such as a stabilizer including antioxidant, UV absorber, thermal stabilizer, and weather stabilizer, and further a lubricator, a mold-releasing agent, a coloring agent, a crystal nucleating agent, and a crystallization-enhancing agent. Furthermore, other thermoplastic resins (such as polyamide and acrylic resin) and thermosetting resins (such as unsaturated PBT resin, phenol resin, and epoxy resin) may be added.

The PBT resin composition according to the present invention may be in the form of a mixture of powder and granule or in the form of a molten mixture, and the PBT resin composition can be prepared by blending the (A) PBT resin, the (B) halogen-based flame retardant, the (C) flame retardant assistant, the (D) nitrogen-based compound, and if required, the (E) fibrous reinforcement, the (F) phosphinic acid salt and/or diphosphinic acid salt, fluorine-based resin, and other additives by an ordinary method. For example, individual components are mixed together, and the mixture obtained is then kneaded in and extruded from a single-screw or twin-screw extruder to obtain the pellets of PBT resin composition. The insulating material parts of the present invention can be obtained by using the PBT resin composition prepared by the above method, and then by molding the composition using a known molding method such as injection molding.

EXAMPLES

The present invention is described in more detail in reference to examples. The present invention, however, is not limited to these examples.

Examples 1 to 8, Comparative Examples 1 to 4

As shown in Table 1, the respective amounts of (B), (C), (D), and (F) components were added to 100 parts by weight of the (A) PBT resin. The mixture was then homogeneously mixed in a V-blender. Thus obtained mixture was charged into a hopper of twin-screw extruder (manufactured by Japan Steel Works, Ltd.). A specified quantity of the (E) glass fiber was supplied to the extruder through a side feed opening. The mixture was melted and kneaded at 260° C. of barrel temperature. The strand discharged from the die was cooled and cut to prepare the pellet-shaped composition. The prepared pellets were dried at 140° C. for 3 hours, which were then molded in an injection molding machine (manufactured by FANUC LTD.) under the condition of 260° C. of cylinder temperature and 80° C. of mold temperature, and thus obtained specified molded article for varieties of tests was obtained. With the molded article for test, various physical properties described below were evaluated. The result is given in Table 1.

(1) GWIT Evaluation

Each of the evaluation test pieces (flat sheet of 8 cm×8 cm×3 mm thick, flat sheet of 8 cm×8 cm×1.5 mm thickness, and flat sheet of 6 cm×6 cm×0.75 mm thickness) was evaluated by the test method specified by IEC60695-2-13. That is, a glow-wire of predetermined shape (looped nickel-chromium (80/20) wire having an outer diameter of 4 mm) was brought into contact with the test pieces for 30 seconds, and the maximum temperature at the tip of the glow-wire when the test pieces are not ignited or the spread of fire to the test pieces is prevented for 5 seconds or longer, was measured. GWIT was defined as the temperature 25° C. higher than the measured maximum temperature. For the uses of flame retardant specified in the Standard, GWIT of 775° C. or above is required.

(2) GWFI Evaluation

For the above test pieces, the evaluation was conducted by the test method specified in IEC60695-2-12. That is, a glow-wire of predetermined shape (looped nickel-chromium (80/20) wire having 4 mm in outer diameter) was brought into contact with the test pieces for 30 seconds, and then the glow-wire was separated from the test pieces. There was measured the maximum temperature at the tip of the glow-wire when the test pieces are not ignited during the separating action or the fire is extinguished within 30 seconds after the separation even if ignited. GWFI was defined as the measured maximum temperature. For the uses of flame retardant, GWFI of 850° C. or above is required.

(3) Fire Retardancy Test

A test piece (1/32 inch of thickness) was tested by the vertical position flame test specified by UL-94 Standard of Underwriter's Laboratories Inc.

(4) Tracking Characteristics (CTI)

The durability to tracking was determined for a test piece (3 mm in thickness) by the test method specified in UL-746.

(5) Tensile Test

Tensile strength and tensile elongation were determined for a dumbbell test piece (4 mm in thickness) specified by ISO294, in accordance with ISO527.

The details of each component used in Examples and Comparative Examples are as follows.

(A) PBT resin

Intrinsic viscosity 0.7 g/dl, manufactured by WinTech Polymer Ltd.

(B) Halogen-based flame retardant (B-1) Polypentabromobenzylacrylate (FR1025, manufactured by Bromchem Far East Co., Ltd.)

(B-2) Ethylenebistetrabromophthalimide (SAYTEX BT93W, manufactured by Albert GmbH)

(B-3) Brominated polystyrene (PDBS-80M GLC, manufactured by Great Lakes Chemical Corporation)

(C) Flame retardant assistant (C-1) Antimony trioxide (PATOX-M, manufactured by Nihon Seiko Co., Ltd.)

(C-2) Antimony pentoxide (Sun Epoch NA1040L, manufactured by

Nissan Chemical Industries, Ltd.)

(D) Nitrogen-based compound: Melamine cyanulate (MC860, manufactured by Nissan Chemical Industries, Ltd.)

(E) Fibrous reinforcement: Glass fiber (ECS03T-127, 10 μm in diameter, manufactured by Nippon Electric Glass Co., Ltd.)

(F) Aluminum salt of 1,2-diethylphosphinic acid

The (F) component was prepared by the following procedure.

A 2106 g (19.5 mole) of diethylphosphinic acid was dissolved in 6.5 liter of water. To the mixture, 507 g (6.5 mole) of aluminum hydroxide was added while vigorously agitating the mixture. The mixture was heated to 85° C. After agitating the mixture at temperatures ranging of 80° C. to 90° C. for 65 hours, the mixture was cooled to 60° C., and then it was filtered by suction. The cake was dried in a vacuum drying cabinet at 120° C. until the mass became constant, and thus 2140 g of fine powder which was not melted at 300° C. or lower temperature was obtained. The yield was 95% of the theoretical value.

Anti-dropping agent: Tetra fluoroethylene resin (Phostaflon TF1620, manufactured by Hoechst Industry Ltd.)

TABLE 1

|  | Examples | | | | | | | | Comparative Examples | | | |
|---|---|---|---|---|---|---|---|---|---|---|---|---|
|  | 1 | 2 | 3 | 4 | 5 | 6 | 7 | 8 | 1 | 2 | 3 | 4 |
| (A) PBT (parts by weight) | 100 | 100 | 100 | 100 | 100 | 100 | 100 | 100 | 100 | 100 | 100 | 100 |
| (B-1) Bromine-based fire retardant (parts by weight) | 26 | 31 | 22 | 22 | 25 | 25 |  |  | 19 | 38 |  |  |
| (B-2) Bromine-based fire retardant (parts by weight) |  |  |  |  |  |  | 23 |  |  |  | 23 |  |
| (B-3) Bromine-based fire retardant (parts by weight) |  |  |  |  |  |  |  | 25 |  |  |  | 25 |
| (C-1) Antimony trioxide (parts by weight) | 21 | 25 | 18 | 18 | 20 |  | 20 | 20 | 15 | 18 | 20 | 20 |
| (C-2) Antimony pentoxide (parts by weight) |  |  |  |  |  | 20 |  |  |  |  |  |  |
| (D) Nitrogen-based compound (parts by weight) | 35 | 63 | 16 | 7 | 15 | 15 | 15 | 15 |  |  |  |  |
| (E) Fibrous reinforcement (parts by weight) | 79 | 94 | 67 | 67 | 76 | 76 | 75 | 76 | 58 | 67 | 75 | 76 |
| (F) Diethylphosphinate (parts by weight) |  |  |  | 9 | 15 | 15 | 15 | 15 |  |  |  |  |
| Anti-dropping agent (parts by weight) | 1 | 1 | 1 | 1 | 1 | 1 | 1 | 1 | 1 | 1 | 1 | 1 |
| GWIT 3 mmt (° C.) | 825 | 925 | 800 | 825 | 850 | 850 | 825 | 825 | 750 | 800 | 750 | 725 |
| GWIT 1.5 mmt (° C.) | 775 | 775 | 725 | 750 | 775 | 800 | 775 | 775 | 700 | 725 | 700 | 700 |
| GWIT 0.75 mmt (° C.) | 800 | 850 | 800 | 800 | 800 | 825 | 825 | 825 | 725 | 725 | 700 | 750 |
| GWFI 3 mmt (° C.) | 960 | 960 | 960 | 960 | 960 | 960 | 960 | 960 | 960 | 960 | 960 | 960 |
| GWFI 1.5 mmt (° C.) | 960 | 960 | 960 | 960 | 960 | 960 | 960 | 960 | 960 | 960 | 960 | 960 |
| GWFI 0.75 mmt (° C.) | 960 | 960 | 960 | 960 | 960 | 960 | 960 | 960 | 960 | 960 | 960 | 960 |
| Fire retardancy UL-94 | V-0 | V-0 | V-0 | V-0 | V-0 | V-0 | V-0 | V-0 | V-0 | V-0 | V-0 | V-0 |
| Tracking characteristics | 300 | 325 | 300 | 300 | 325 | 325 | 300 | 300 | 275 | 250 | 250 | 250 |
| Tensile strength (MPa) | 106 | 84 | 123 | 112 | 113 | 113 | 103 | 104 | 150 | 142 | 124 | 122 |
| Tensile elongation (%) | 1.1 | 0.8 | 1.4 | 1.2 | 1.3 | 1.3 | 1.2 | 1.2 | 2.0 | 1.7 | 2.0 | 2.0 |

As shown in Table 1, the polybutylene terephthalate resin composition according to the present invention can attain 775° C. or higher glow-wire ignition temperature specified in IEC60695-2-13 for any of the test piece thicknesses of 0.75 mm, 1.5 mm, and 3 mm.

That is, as is clear from the comparison between Comparative Example 1 and Comparative Example 2, sole increase in the amount of halogen-based flame retardant cannot achieve the above GWIT characteristics. In contrast, through the addition of a nitrogen-based compound, the present invention can improve the durability to glow-wire and satisfy the 775° C. or higher GWIT and the 850° C. or higher GWFI, specified by IEC60695-2-13, over a thickness range of as thin as 0.75 mm to as thick as 3 mm. Furthermore, the use of phosphinic acid salts makes it possible to decrease the amount of nitrogen-based compound, and to decrease adverse effects on the mechanical characteristics.

The invention claimed is:

1. A polybutylene terephthalate resin composition for insulating parts which exhibits an improved glow-wire ignition temperature which satisfies the requirement of a 775° C. or higher glow-wire ignition temperature specified by IEC60695-2-13 at each of the test piece thicknesses of 0.75 mm, 1.5 mm and 3 mm combined with a V—O flame retardancy pursuant to the UL-94 standard, consisting essentially of: (A) 100 parts by weight of a polybutylene terephthalate resin; (B) 15 to 40 parts by weight of polypentabromobenzylacrylate flame retardant; (C) 5 to 50 parts by weight of antimony trioxide; (D) 35 to 63 parts by weight of melamine cyanurate; and (E) 30 to 100 parts by weight of glass fibrous reinforcement having a diameter of 3 to 30 μm and a length of 0.1 to 20 mm, and wherein said composition does not comprise polyethylene terepthalate, or a phosphinic acid or salt thereof.

2. An insulated part wherein the insulating material consists essentially of a polybutylene terephthalate resin composition that exhibits an improved glow-wire ignition temperature which satisfies the requirement of a 775° C. or higher glow-wire ignition temperature specified by IEC60695-2-13 at each of the test piece thicknesses of 0.75 mm, 1.5 mm and 3 mm combined with a V—O flame retardancy pursuant to the UL-94 standard, and consists essentially of: (A) 100 parts by weight of a polybutylene terephthalate resin; (B) 15 to 40 parts by weight of polypentabromobenzylacrylate flame retardant; (C) 5 to 50 parts by weight of antimony trioxide; (D) 35 to 63 parts by weight of melamine cyanurate; and (E) 30 to 100 parts by weight of a glass fibrous reinforcement having a diameter of 3 to 30 μm and a length of 0.1 to 20 mm, and wherein said composition does not comprise polyethylene terephthalate, or a phosphinic acid or salt thereof.

3. The polybutylene terephthalate resin composition according to claim 1 wherein said polybutylene terephthalate (A) has an intrinsic viscosity of 0.65 to 0.9 g/dl determined at 25° C.

4. The polybutylene terephthalate resin composition according to claim 1 wherein said polybutylene terephthalate (A) has an intrinsic viscosity of 0.7 g/dl determined at 25° C.

5. The polybutylene terephthalate resin composition according to claim 1 wherein said antimony trioxide (C) is present in a concentration of 10 to 40 parts by weight.

6. The polybutylene terephthalate resin composition according to claim 1 wherein said antimony trioxide (C) is present in a concentration of 15 to 30 parts by weight.

7. The polybutylene terephthalate resin composition according to claim 1 wherein the glass fibrous reinforcement is present in a concentration of 79 to 94 parts by weight.

8. The polybutylene terephthalate resin composition according to claim 1 wherein said glass fibrous reinforcement (E) is glass fiber having a diameter of 10 μm.

9. An insulated part wherein the insulating material consists essentially of the polybutylene terephthalate resin composition according to claim 3.

10. An insulated part wherein the insulating material consists essentially of the polybutylene terephthalate resin composition according to claim 4.

11. An insulated part wherein the insulating material consists essentially of the polybutylene terephthalate resin composition according to claim 5.

12. An insulated part wherein the insulating material consists essentially of the polybutylene terephthalate resin composition according to claim 6.

13. An insulated part wherein the insulating material consists essentially of the polybutylene terephthalate resin composition according to claim 7.

14. An insulated part wherein the insulating material consists essentially of the polybutylene terephthalate resin composition according to claim 8.

* * * * *